United States Patent Office 3,293,265
Patented Dec. 20, 1966

3,293,265
PREPARATION OF π-(2,4)-(BUTENO-4-LACTONYL) COBALT TRICARBONYL COMPOUNDS
Richard F. Heck, Wilmington, Del., assignor to Hercules Incorporated, a corporation of Delaware
No Drawing. Filed Jan. 24, 1964, Ser. No. 339,850
12 Claims. (Cl. 260—343.6)

This invention relates to novel π-(2,4)-(buteno-4-lactonyl) cobalt tricarbonyl compounds, a process for producing them, and to a process for preparing 2,4-pentadieno-4-lactones from said π-(2,4)-(buteno-4-lactonyl) cobalt tricarbonyl compounds. More particularly, this invention relates to the reaction of an acetylenic compound with an acylcobalt carbonyl whereby there is obtained a π-(2,4)-(buteno-4-lactonyl) cobalt tricarbonyl compound which, on reaction with a base, yields the 2,4-pentadieno-4-lactone when there is a hydrogen atom on the carbon atom adjacent to the carbonyl radical in said acylcobalt carbonyl.

2,4 - pentadieno - 4 - lactone derivatives generally are known to have biocidal activity, probably because they contain the unsaturated lactone ring. A few occur as natural products in some plants, from which they may be recovered by laborious and expensive extractive methods. A typical example is the naturally occurring insecticide, vulpinic acid, which is 2-phenyl-3-hydroxy-5-phenyl-5-carbomethoxy-2,4-pentadieno - 4 - lactone. It has been proposed to prepare other pentadieno lactones, such as proto-anemonin or its homologs, from various gamma-keto-carboxylic acids having 5 to 8 carbon atoms or their esters or amides by a combination of dehydrogenation and dehydration. However, this procedure is of quite limited applicability, since it leads to production only of the specific products named and may not be applied to the production of 2,4-pentadieno-4-lactones generally.

Now in accordance with this invention it has been found that novel π-(2,4)-(buteno-4-lactonyl) cobalt tricarbonyls generally may be prepared by the reaction of acylcobalt carbonyl having the formula

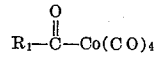

with an acetylenic compound having the formula $R_2$—C≡C—$R_3$. The reaction that takes place may be expressed as follows:

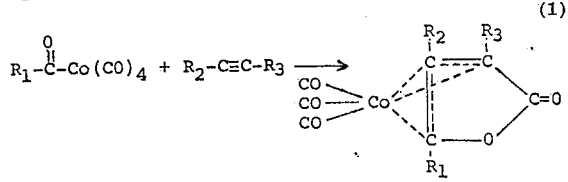
(1)

in which $R_1$ represents a saturated or ethylenically unsaturated aliphatic or cycloaliphatic radical, or an aromatic radical, and in which $R_2$ and $R_3$ may be the same or different and each represents a radical of the group consisting of hydrogen, saturated and ethylenically unsaturated aliphatic and cycloaliphatic radicals, and aromatic radicals.

It has further been found in accordance with this invention, that when $R_1$ in the acylcobalt carbonyl having the formula $$R_1-\overset{O}{\overset{\|}{C}}-Co(CO)_4$$

has a hydrogen atom on the carbon atom attached to the carbonyl group, the π-(2,4)-(buteno-4-lactonyl) cobalt tricarbonyl complex readily undergoes reaction in the presence of a base to form 2,4-pentadieno-4-lactones as expressed by the following reaction.

(2)

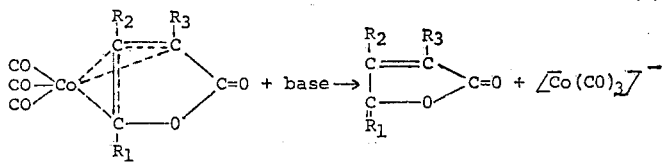

2,4-pentadieno-4-lactones generally may be prepared in accordance with reaction (2) above.

With reference to reaction (1) above, acylcobalt carbonyls suitable for the purposes of this invention may be synthesized in a variety of ways. For example, acylcobalt carbonyls can be prepared by the reaction of a salt of cobalt hydrotetracarbonyl with an acyl halide as expressed by the following reaction:

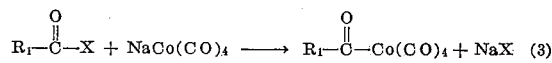 (3)

in which $R_1$ has the same meaning as described under reaction (1) hereinbefore, and X is a halogen.

With reference to reactions (1), (2) and (3) above, it has been found that 2,4-pentadieno-4-lactones can be prepared directly in one step by reacting together an acyl halide of the formula $$R_1-\overset{O}{\overset{\|}{C}}-X$$

having a hydrogen atom on the carbon atom attached to the carbonyl group, a salt of cobalt hydrotetracarbonyl, an acetylenic compound of the formula $R_2$—C≡C—$R_3$, and a hindered base such as dicyclohexylethyl amine as expressed by the following reaction:

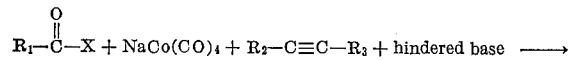
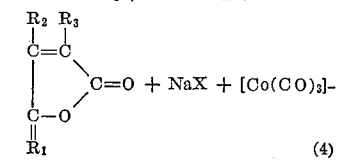
(4)

in which $R_1$, $R_2$, $R_3$ and X have the same meaning as set forth hereinabove.

The single step process as expressed by reaction (4) above can be carried out catalytically with respect to the salt of cobalt hydrotetracarbonyl by conducting the process in the presence of carbon monoxide so that cobalt tetracarbonyl ion is regenerated according to the following reaction and is then reused in the process:

[Co(CO)₃]⁻ + CO → [Co(CO)₄]⁻ (5)

By so operating, it is possible to produce many moles of 2,4-pentadieno-4-lactone per mole of cobalt hydrotetracarbonyl salt used. Eventually, however, the catalyst is slowly used up in side reactions producing the stable acetylene-dicobalt-hexacarbonyl complex, and must be replaced by fresh catalyst, as required, to operate the process continuously.

In the place of the sodium cobalt tetracarbonyl used in the foregoing reactions, there may be used any alkali metal-, ammonium-, or quaternary ammonium salt of cobalt hydrotetracarbonyl, as well as alkaline earth metal salts of cobalt hydrotetracarbonyl such as the magnesium salt or the calcium salt. Instead of using a salt of cobalt hydrotetracarbonyl, there may be used cobalt octacarbonyl as the source of the cobalt tetracarbonyl ion. It is believed that cobalt octacarbonyl disproportionates in the reaction mixture into cobalt tetracarbonyl anion as follows:

3 $Co_2(CO)_8 \rightleftharpoons$ 2 $Co(Co[CO]_4)_2$ + 8 CO

Acylcobalt carbonyls can also be prepared by the reaction of a salt of cobalt hydrotetracarbonyl with carbon monoxide and an organic halide which can be a monohalogen or dihalogen substituted organic compound containing at least one aliphatic or cycloaliphatic radical in which the halogen is attached to a primary or secondary carbon atom as expressed by the following reaction:

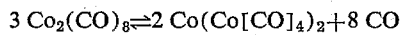

(6)

in which $R_4$ represents a saturated or ethylenically unsaturated aliphatic or cycloaliphatic radical, and X is a halogen.

Instead of presynthesizing the acylcobalt carbonyl as shown in reaction (6) above, the acylcobalt carbonyl can be formed in situ, in which case the reaction that takes place in forming the π-(2,4)-(buteno-4-lactonyl) cobalt tricarbonyls may be expressed as

(7)

in which $R_4$, $R_2$, $R_3$ and X have the same meanings as set forth hereinabove.

With reference to reactions (2) and (7) above, it has been found that 2,4-pentadieno-4-lactones can be prepared directly in one step by reacting together an alkyl halide of the formula $R_4X$ having at least one hydrogen atom on the carbon atom attached to the halogen X, a salt of cobalt hydrotetracarbonyl, an acetylenic compound of the formula $R_2$—C≡C—$R_3$, carbon monoxide, and a base as expressed by the following reaction:

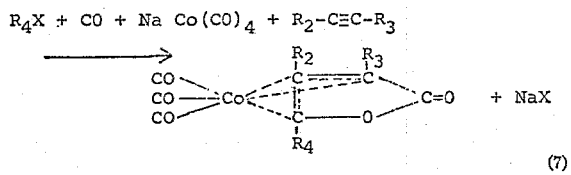

(8)

in which $R_4$, $R_2$, $R_3$ and X have the same meanings as set forth hereinabove. It is apparent, of course, that this process is substantially catalytic with respect to the salt of cobalt hydrotetracarbonyl, since carbon monoxide is a necessary reactant in this embodiment of the invention.

Acylcobalt carbonyls suitable for the purposes of this invention can also be prepared by the reaction of cobalt hydrotetracarbonyl and carbon monoxide with ethylenically unsaturated compounds of the general formula $RCH=CH_2$ as expressed by the following reaction:

$RCH=CH_2$ + CO + $HCo(CO)_4$ ⟶

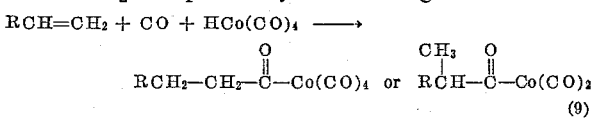

(9)

in which R represents a radical of the group consisting of hydrogen, saturated and ethylenically unsaturated aliphatic and cycloaliphatic radicals, and aromatic radicals. In the case where R is ethylenically unsaturated and conjugated to the terminal double bond in the compound $RCH=CH_2$, the cobalt hydrotetracarbonyl adds in the 1,4 positions, rather than the 1,2 positions as depicted by Equation 9. Thus butadiene reacts as follows:

$CH_2=CH-CH=CH_2$ + CO + $HCo(CO)_4$ ⟶

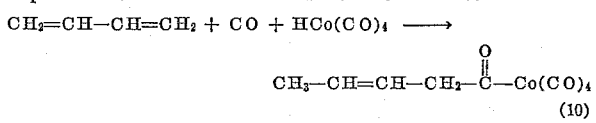

(10)

Another method for obtaining acylcobalt carbonyls suitable for the purposes of this invention is by the reaction of cobalt hydrotetracarbonyl and carbon monoxide with epoxides of the formula $$RCH\underset{O}{\overset{}{\diagdown\diagup}}CHR$$

as expressed for the following reaction:

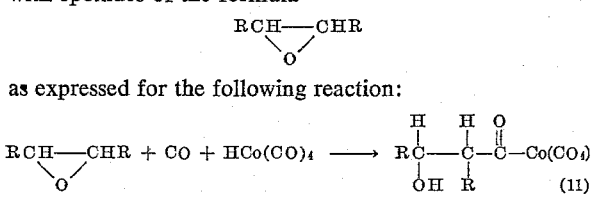

(11)

in which each R, which may be the same or different, has the same meaning as hereinabove described for reaction (9).

The new π-(2,4)-(buteno-4-lactonyl) cobalt tricarbonyl complexes formed in accordance with Equations 1 or 7 may be isolated as such, by evaporation of the reaction diluent at low temperature, preferably under reduced pressure, or they may be isolated in the form of their monotriphenylphosphine derivatives, which are usually higher melting and more stable than the tricarbonyl complex per se. These phosphine derivatives are easily prepared by adding triphenylphosphine to a solution of the tricarbonyl complex at about 0° C. to about 50° C. and then evaporating the solvent to isolate the phosphine derivative. This reaction may be expressed as follows:

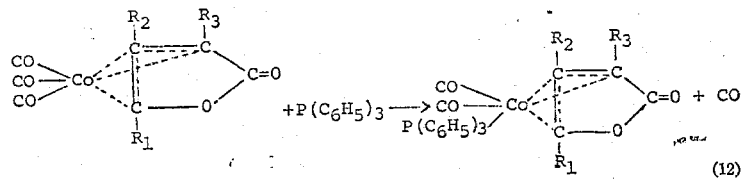

(12)

The new π-(2,4)-(buteno-4-lactonyl) cobalt tricarbonyl complexes are believed to have the structure set forth below where the carbon atoms of the buteno group are in a plane above the cobalt atom. The buteno group appears to be more or less symmetrical and π-bonded to the cobalt. The carbon atoms of the buteno grouping have been numbered as shown to aid in naming these compounds.

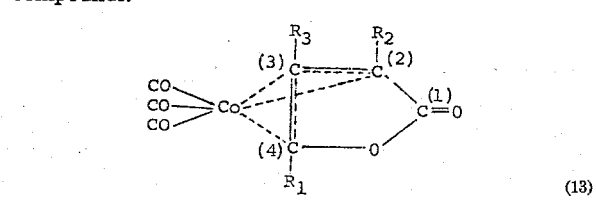

(13)

The following examples will illustrate the preparation of the new π-(2,4)-(buteno-4-lactonyl) cobalt tricarbonyls and the prepapartion of 2,4-pentadieno-4-lactones therefrom. All parts and percentages are by weight unless otherwise indicated.

Example 1

In a reaction flask connected to a gas buret and filled with carbon monoxide at 0° C. were placed 30 ml. of 0.07 M sodium cobalt tetracarbonyl in ether and 3.0 ml. of 1.2 M acetyl chloride in ether. After 90 minutes the infrared spectrum showed that acetylcobalt tetracarbonyl had been formed. Then 2.0 ml. of 3-hexyne was added. The solution gradually became orange, evolved 10.6 ml. of gas in 2 hours, and then stopped reacting. The infrared spectrum of the reaction mixture now had the strong band at 5.6μ which is characteristic of the 4-lactonyl compounds. The product formed by this reaction was 2,3-diethyl-π-(2,4)-(penteno-4-lactonyl) cobalt tricarbonyl having the following structural formula:

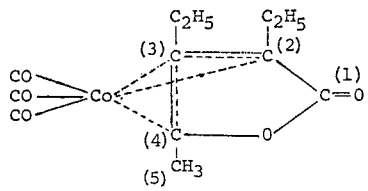

Since this product is low melting and rather unstable, it was converted into its more stable, higher melting monotriphenylphosphine derivative for isolation. For this purpose 4.0 ml. of 1.0 M triphenylphosphine in ether were added to the reaction mixture. After 2.5 hours 1.56 mmoles of carbon monoxide were evolved and the reaction stopped. The monotriphenylphosphine derivative formed was isolated by evaporating the solvent and extracting the product with several small portions of ether. The ether was evaporated and the residue was recrystallized three times from a mixture of tetrahydrofuran and pentane. The red-orange needles obtained melted at 85° C. with decomposition. Analysis for carbon and hydrogen gave 65.44% carbon and 5.50% hydrogen. The theoretical values for $C_{29}H_{28}O_4PCo$ are 65.66% carbon and 5.32% hydrogen.

Example 2

In a reaction vessel which was connected to a gas buret and filled with carbon monoxide at 27° C. were placed 30 ml. of 0.07 M sodium cobalt tetracarbonyl, 2.0 ml. of dicyclohexylethylamine, 2.0 ml. of 3-hexyne and 2.5 ml. of 1.0 M ethyl bromoacetate in ether. The solution turned brown and absorbed gas. In 76 minutes 1.5 mmoles of carbon monoxide were absorbed. Now another 2.5 ml. of 1.0 M ethyl bromoacetate in ether were added. After reacting overnight a total of 2.54 mmoles of gas were absorbed. The reaction mixture was poured into water and the ether layer was separated. After washing with water, cold dilute hydrochloric acid, and finally with water again, the ether solution was dried with anhydrous magnesium sulfate and the solvent was distilled off. The residue was recrystallized three times from pentane at −80° C. and then distilled at 150° C. at 1 mm. pressure. The pale yellow liquid obtained was 2,3-diethyl-5-carboethoxy-2,4-pentadieno-4-lactone having the following formula:

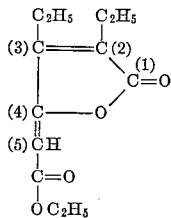

This product melted below room temperature. The infrared spectrum had bands at 5.6μ and 5.85μ as expected. The ultraviolet spectrum in cyclohexane solution had λ maximum 274 mμ with ε=28,500. Analysis for carbon and hydrogen gave 63.68% carbon and 7.41% hydrogen. The theoretical values for $C_{12}H_{16}O_4$ are 63.21% carbon and 7.19% hydrogen.

Example 3

In a reaction flask which was attached to a gas buret and filled with carbon monoxide were placed 60 ml. of 0.07 M sodium cobalt tetracarbonyl in ether, 4.0 ml. of 3-hexyne and 2.0 ml. of dicyclohexylethylamine. The solution was cooled to 0° C. and 5.0 ml. of 1.0 M methyl 4-bromocrotonate in ether was added. The solution turned red, evolved 18 ml. of gas in 18 minutes, and then absorbed 2 ml. of gas in the next 43 minutes before the reaction was complete. The reaction mixture was poured into water and the product was isolated as described in Example 2. After evaporation of the ether solution a dark-red oil was obtained. The product was purified by dissolving the oil in hexane and cooling to −80° C., whereupon a brown solid crystallized out. After several recrystallizations from hexane about 0.2 g. of shiny colorless needles of 2,3-diethyl-7-carbomethoxy-2,4,6-heptatrieno-4-lactone were obtained having a melting point of 85.8°–86.4° C., and the following formula:

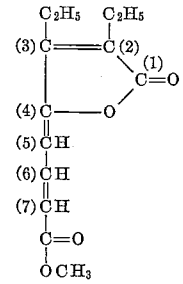

The ultraviolet spectrum of the product in cyclohexane solution had λ maximum 318 mμ with ε=37,500. There was a shoulder at 330 mμ with ε=32,900 and another band at 220 mμ with ε=8,800. Analysis for carbon and hydrogen gave 65.88% carbon and 6.85% hydrogen. The theoretical values for $C_{13}H_{16}O_4$ are 66.09% carbon and 6.83% hydrogen.

Example 4

In a reaction flask filled with carbon monoxide at 25° C. and attached to a gas buret were placed 30 ml. of 0.07 M sodium cobalt tetracarbonyl in ether, 1.0 ml. of 3-hexyne, 1.0 ml. of dicyclohexylethylamine and 2.7 ml. of 1.0 M chloroacetonitrile in ether. The reaction mixture turned dark red, evolved 20 ml. of gas in 7 minutes, and then absorbed a total of 140 ml. of gas after reacting overnight. The products of two such reactions were combined and poured into water and extracted as described in Example 2. Addition of pentane to the oil obtained after evaporation of the ether solution caused the compound to crystallize. After several recrystallizations from a mixture of methylene chloride and pentane, a final crystallization from ethyl acetate—penetane gave colorless crystals of 2,3-diethyl-5-cyano-2,4-pentadieno-4-lactone having a melting point of 87°–88.2° C., and having the following formula:

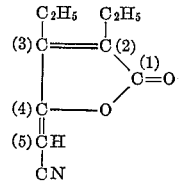

The ultraviolet spectrum in cyclohexane had λ maximum 278 mμ with ε=22,700. Analysis for carbon and hydrogen gave 67.78% carbon and 6.26% hydrogen. The theoretical values for $C_{10}H_{11}O_2N$ are 67.57% carbon and 6.26% hydrogen.

Example 5

In a reaction flask filled with carbon monoxide at 0° C. and attached to a gas buret were placed 20 ml. of ether, 1.0 ml. of trimethylene oxide, and 3.6 ml. of 0.25 M cobalt hydrotetracarbonyl in pentane solution. In 1.75 hours 0.88 mmole of carbon monoxide were absorbed forming 4-hydroxybutyrylcobalt tetracarbonyl. Addition of 1.0 ml. of 3-hexyne to the solution caused the evolution of 4 ml. of gas and the solution changed from pale yellow to orange. The infrared spectrum had the expected lactone carbonyl absorption at 5.61μ indicating that 2,3-diethyl-7-hydroxyl-π-(2,4)-(hepteno-4-lactonyl) cobalt tricarbonyl having the following formula had been formed:

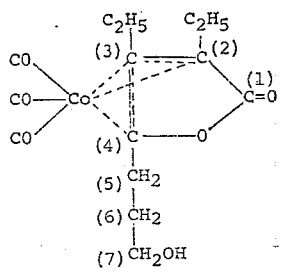

Example 6

In a carbon monoxide filled recation vessel at 25° C., attached to a gas buret, were placed 40 ml. of 0.1 M sodium cobalt tetracarbonyl in tetrahydrofuran, 3.0 ml. of 3-hexyne, 3.0 ml. of dicyclohexylethylamine and 3.0 ml. of 1.0 M p-nitrobenzyl bromide in tetrahydrofuran. After an initial evolution of 12 ml. of gas, absorption began. In 2 hours 33 ml. of carbon monoxide were absorbed and the reaction became quite slow. After reacting overnight another 3.0 ml. of 1.0 M p-nitrobenzyl bromide in tetrahydrofuran were added. After the reaction stopped the solvent was evaporated in vacuum and the residue was dissolved in ether. The ether solution was washed with water, cold dilute hydrochloric acid, water again, and finally with aqueous sodium bicarbonate. After drying with anhydrous magnesium sulfate the ether solution was evaporated and the residue was recrystallized several times from hot hexane. About 0.1 g. of yellow-brown needles of 2,3 - diethyl-5-p-nitrophenyl - 2,4-pentadieno - 4-lactone having a melting point of 135.2° C.–136.4° C., and the following formula were obtained:

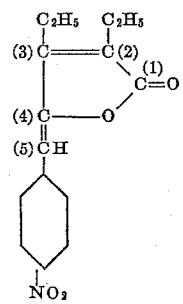

The ultraviolet spectrum in cyclohexane had three bands, 347 mμ with ε=31,800, 332 mμ with ε=27,000, and 366 mμ with ε=22,300. Analysis for carbon and hydrogen gave 65.92% carbon and 5.11% for hydrogen. The theoretical values for $C_{15}H_{15}O_4N$ are 65.92% carbon and 5.53% hydrogen.

Example 7

In a reaction flask filled with carbon monoxide at 30° C. and attached to a gas buret were placed 40 ml. of 0.1 M sodium cobalt tetracarbonyl in tetrahydrofuran, 3.0 ml. of dicyclohexylethylamine, 3.0 ml. of 3-hexyne, and 0.5 ml. (0.96 g.) of ethyl 2-bromopropionate. After reacting overnight 30.5 ml. of carbon monoxide were absorbed. The product was isolated as described in Example 6. The dark oil obtained after evaporating the ether solution was reprecipitated several times from hexane by cooling. About 0.15 g. of a liquid product having a strong infrared absorption band at 5.66μ (lactone carbonyl) and at 5.77μ (ester carbonyl) were obtained. The ultraviolet spectrum in cyclohexane had λ maximum 281 mμ with ε=4,760. The spectrum indicated that approximately 20% of the isolated liquid product was 2,3-diethyl-5-carboethoxy-2,4-hexadieno-4-lactone having the following formula:

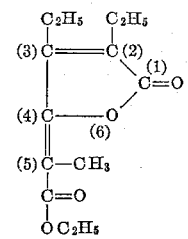

Example 8

In a reaction flask filled with carbon monoxide at 30° C. and connected to a gas buret were placed 60 ml. of 0.1 M sodium cobalt tetracarbonyl in tetrahydrofuran solution, 3.0 ml. of tertiary butyl acetylene, 3 ml. of dicyclohexylethylamine, and 1.0 ml. of chloroacetonitrile. After reacting overnight, 7.8 mmoles of carbon monoxide were absorbed. The reaction mixture had a strong infrared absorption band at 5.6μ. The product was isolated as described in Example 6. Extraction of the dark oil left after evaporation of the ether solution several times with boiling hexane, followed by cooling of the hexane extracts to —80° C. gave crystals of the 3(2)-tertiary - butyl - 5-cyano-2,4-pentadieno-4-lactone having the following formulae:

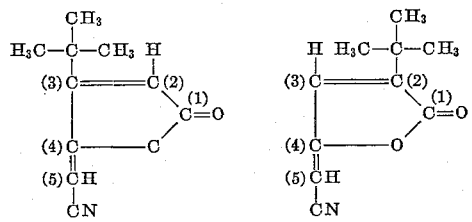

Two further recrystallizations from hexane containing a little benzene gave about 0.1 g. of nearly colorless crystals having a melting point of 92.8° C.–94.2° C. The ultraviolet spectrum in cyclohexane solution had λ maximum 281 mμ with ε=28,900. Analysis for carbon and hydrogen gave 67.98% carbon and 6.39% hydrogen. The theoretical values for $C_{10}H_{11}O_2N$ are 67.78% carbon and 6.26% hydrogen.

Example 9

In a reaction vessel filled with nitrogen at 0° C. were placed 0.5 g. of 2,5-dimethyl-2,5-dihydroxy-3-hexyne, 30 ml. of 0.07 M sodium cobalt tetracarbonyl in ether and 3.0 ml. of 1.0 M ethyl bromoacetate in ether. After about 2 hours at 0° C the reaction was complete and part of the 2,3 - bis(1 - methyl-1-hydroxyethyl)-5-carboethoxy-π-(2, 4)-(penteno-4-lactonyl) cobalt tricarbonyl which was formed crystallized out as orange crystals, the formula for this compound being:

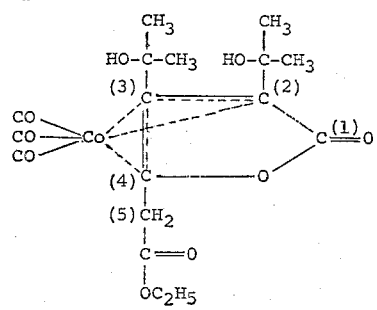

The ether solvent was then evaporated at 0° C. and the compound was redissolved in 10 ml. of tetrahydrofuran. This solution was transferred in the absence of air to a closed carbon monoxide filled reaction vessel at 25° C., which was connected to a gas buret. Addition of 2.0 ml. of dicyclohexylethylamine caused carbon monoxide absorption to begin. After the reaction was complete, the mixture had a lactone carbonyl band at 5.64μ in its infrared spectrum and a band at 263 mμ with ε=8,100 in the ultraviolet region in methanol solution proving that 2,3 - bis(1 - methyl-1-hydroxy-ethyl)-5-carboethoxy-2,4-pentadieno-4-lactone having the following formula had been formed:

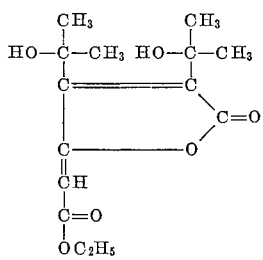

*Example 10*

In a nitrogen filled reaction flask were placed 200 ml. of 0.07 M sodium cobalt tetracarbonyl in ether solution. The flask and contents were cooled to 0° C., and 8 ml. of 3-hexyne and 3.05 g. of benzoyl bromide were added and the reaction mixture was stirred at 0° C. for 2½ hours, whereupon the reaction was substantially complete. The infrared spectrum of the reaction mixture now had the strong absorption band at 5.69μ which is characteristic of the 4-lactone compounds, and the product formed by this reaction was 2,3-diethyl-4-phenyl-π-(2,4)-(buteno-4-lactonyl) cobalt tricarbonyl having the formula:

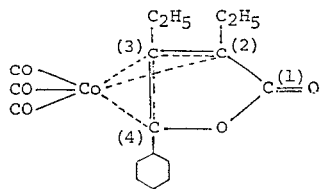

There was now added dropwise to the reaction mixture 120 ml. of 0.2 M aqueous solution of KI–I₂. When gas evolution ceased, indicating substantial completion of the reaction, 3 g. of NaHSO₃ in about 30 ml. of water were added. The solution was then placed in a separatory funnel, the water layer was drained off, and the ethereal layer was washed several times with water and then with dilute aqueous NaHSO₃. The ether solution was then dried with anhydrous magnesium sulfate, the ether was evaporated, and the crystalline solid was triturated with pentane. There was recovered 1.14 g. of a crystalline solid having a melting point of 182.5° C.–184° C. with the empirical formula $C_{28}H_{30}O_4$. Analysis for carbon and hydrogen gave 78.08%; 77.94% carbon and 7.20%; 7.12% hydrogen. Theoretical values for $C_{28}H_{30}O_4$ are 78.1% carbon and 7.04% hydrogen.

Analysis by nuclear magnetic resonance indicated the compound to be a dilactone derivative of hexendioic acid having the formula:

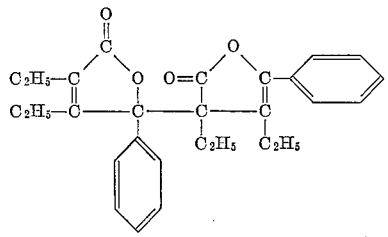

Any acyl halide having the formula $$R_1-\overset{O}{\underset{\|}{C}}-X$$

in which $R_1$ represents a radical of the group consisting of saturated and ethylenically unsaturated aliphatic radicals, saturated and ethylenically unsaturated cycloaliphatic radicals and aromatic radicals is suitable for the purposes of this invention. Thus, by way of example, $R_1$ can be any alkyl, alkenyl, cycloalkyl, cycloalkenyl, aryl, aralkyl, aralkenyl, alkaryl, or alkenylaryl hydrocarbon residue, as well as any substituted alkyl, alkenyl, cycloalkyl, cycloalkenyl, aryl, aralkyl, aralkenyl, alkaryl, or alkenylaryl hydrocarbon residue in which the substituent can be halogen, alkoxy, alkenyloxy, carboalkyl, carboalkoxy, aroylalkyl, cyano, nitro, alkylsulfonylalkyl, and the like.

Some typical acyl halides which can be employed include, for example, acetyl chloride, acetyl bromide, propionyl chloride, isobutyroyl bromide, secondary butyroyl chloride, tertiarybutyroyl bromide, hexanoyl bromide, octanoyl chloride, undecanoyl chloride, acrylyl bromide, crotonyl chloride, 3,3-dimethyl acrylyl chloride, 10-undecenoyl chloride, 2,4-pentadienoyl chloride, 2,4-hexadienoyl chloride (sorbyl chloride), oleyloyl chloride, cyclopentylacetyl chloride, cyclohexylacetyl chloride, cyclopentenylcarbonyl bromide, cyclobutyroyl chloride, cyclopentenylcarbonyl chloride, benzoyl chloride, benzoyl bromide, p-toluoyl chloride, α-naphthylacetyl chloride, α-naphthoyl chloride, α-anthracylacetyl bromide, α-anthracyloyl chloride, xylyloyl chloride, p-tertiarybutyl benzoyl chloride, chloroacetyl bromide, bromoacetyl chloride, iodobutyroyl chloride, trifluoromethylacetyl chloride, cyanoformyl bromide, cyanoacetyl chloride, carbomethoxyacetyl chloride, carboethoxybutyroyl chloride, phenylpropionyl chloride, p-bromophenylpropionyl chloride, m-nitrophenylbutyroyl chloride, o-methoxybenzoyl bromide, chlorocyclohexylcarbonyl chloride, methoxyacetyl bromide, methoxybutenoyl chloride, formylacetyl chloride, acetylbutyroyl chloride, benzoylacetyl chloride, p-bromobenzoylcyclopentylcarbonyl chloride, methylsulfonylacetyl bromide, p-chlorobenzoyl chloride, m-nitrobenzoyl chloride, o-methoxybenzoyl bromide, 3,4-methylenedioxybenzoyl chloride, 2,4-dichlorobenzoyl chloride, p-allyloxybenzoyl chloride, pivalyloyl chloride, cinnamoyl chloride, monomethylsuccinoyl chloride, 2-cyanopropionyl chloride, terphthaloyl chloride, adipoyl chloride, 5-chloropentanoyl chloride, trimethylacetyl bromide, etc.

As pointed out hereinbefore, acylcobalt carbonyls can be prepared by the reaction of a salt of cobalt hydrotetracarbonyl with carbon monoxide and an organic halide which can be a monohalogen or dihalogen substituted organic compound containing at least one aliphatic or cycloaliphatic radical in which the halogen is attached to a primary or secondary carbon atom. Thus, any organic halide having the general formula $R_4X$ in which $R_4$ can be alkyl, alkenyl, cycloalkyl, cycloalkenyl, aralkyl, or aralkenyl hydrocarbon residue, as well as substituted alkyl, alkenyl, cycloalkyl, cycloalkenyl, aralkyl or aralkenyl hydrocarbon residue in which the substituent can be halogen, hydroxy, alkoxy, alkenyloxy, carboalkyl, carboalkoxy, aroylalkyl, cyano, nitro, alkylsulfonylalkyl, etc., is suitable for use in this invention.

Some typical alkyl halides suitable for the purposes of this invention include, for example, methyl chloride, methylene chloride, methyl iodide, ethyl chloride, ethylene dichloride, ethyl bromide, propyl chloride, isopropyl chloride, n-butyl chloride, isobutyl bromide, secondary butyl chloride, tertiary butyl bromide, pentyl iodide, hexyl bromide, 2-iodooctane, 1,8-dibromooctane, undecyl chloride, stearyl bromide, allyl bromide, allyl chloride, butenyl chloride, crotyl chloride, crotyl fluoride, crotyl bromide, methallyl chloride, undecenyl chloride, oleyl chloride, cyclopentyl chloride, cyclohexyl chloride, methyl cyclohexyl bromide, cyclobutyl chloride, tetrahydrofurfuryl chloride, cyclopentenyl bromide, cyclohexenyl iodide, 5-octenyl bromide, benzyl chloride, benzyl bromide, benzyl fluoride, benzyl iodide, a-chloromesitylene, a-iodoxylene (ortho, meta and para), a-naphthyl chloride, phenylpropyl chloride, phenylbutenyl bromide, chloroethyl bromide, chloroisopropyl chloride, chlorobutyl iodide, bromobutyl chloride, trifluoromethylethyl chloride, cyanomethyl bromide, cyanoethyl chloride, carbomethoxyethyl chloride, carboethoxybutyl chloride, p-bromophenylpropoyl chloride, m-nitrophenylbutyl chloride, o-methoxybenzyl bromide, chlorocyclohexyl chloride, hydroxyethyl chloride, hydroxypropyl bromide, hydroxycyclopentyl iodide, hydroxymethylbenzyl chloride, methoxyethyl bromide, methoxybutyl chloride, formylethyl chloride, acetylbutyl chloride, benzoylethyl chloride, p-bromobenzoylcyclopentyl chloride, methylsulfonylethyl bromide, p-chlorobenzyl chloride, m-nitrobenzyl chloride, o-methoxybenzyl bromide, ortho-, meta-, and paramethoxybenzyl chlorides, α-monochloroxylene, α,α'-dichloroxylene, α-chloromethylnaphthalene, di-chlormethyl naphthalene, cinnamyl chloride, chloromethylmethyl ether, β-chloroethylethyl ether, β,β'-dichlorodiethyl ether, chloromethylisobutyl ether, β-bromoethylvinyl ether, α-chloropropylpropyl ether, methyl chloroacetate, ethyl bromoacetate, methyl 3-chloropropionate, ethyl α-bromopropionate, methyl p-chloromethyl benzoate, sodium chloroacetate, sodium chloropropionate, chloroacetonitrile, 3-chloropropionitrile, 3-bromobutylronitrile 3-chloropropyl methyl ketone, chloromethyl methyl ketone, etc.

As pointed out previously, acylcobalt carbonyls for the purposes of this invention can also be prepared by the reaction of cobalt hydrotetracarbonyl and carbon monoxide with ethylenically unsaturated compounds (olefinic compounds) of the general formula $RCH=CH_2$, in which R represents a radical of the group consisting of hydrogen, saturated and ethylenically unsaturated aliphatic radicals, saturated and ethylenically unsaturated cycloaliphatic radicals, and aromatic radicals. Thus, R can be any alkyl, alkenyl, cycloalkyl, cycloalkenyl, aryl, aralkyl, aralkenyl, alkaryl, or alkenylaryl hydrocarbon residue, as well as any substituted alkyl, alkenyl, cycloalkyl, cycloalkenyl, aryl, aralkyl, aralkenyl, alkaryl, or alkenylaryl hydrocarbon residue in which the substituent can be halogen, hydroxy, alkoxy, alkenyloxy, carboalkyl, carboalkoxy, aroylalkyl, cyano, nitro, alkylsulfonylalkyl, and the like. Some typical olefins include, by way of example, ethylene, propylene cis-2-butene, isobutylene, 1-pentene, cyclopentene, cyclohexene, styrene, vinyl cyclohexene, butadiene, isoprene, etc., and substituted olefins such as methyl acrylate, methyl 3-butenoate, 4-chloro-1-butene, divinyl ether, vinyl acetate, etc.

As pointed out previously, another method for preparing the acylcobalt carbonyls for use in this invention is by the reaction of cobalt hydrotetracarbonyl and carbon monoxide with epoxides of the general formula

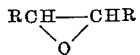

in which each R which may be the same or different represents a radical of the group consisting of hydrogen, saturated and ethylenically unsaturated aliphatic radicals, saturated and ethylenically unsaturated cycloaliphatic radicals, and aromatic radicals. Thus, each R which may be the same or different, can be hydrogen, or any alkyl, alkenyl, cycloalkyl, cycloalkenyl, aryl, aralkyl, aralkenyl, alkaryl or alkenylaryl hydrocarbon residue, as well as any substituted alkyl, alkenyl, cycloalkyl, cycloalkenyl, aryl, aralkyl, aralkenyl, alkaryl, or alkenylaryl hydrocarbon residue in which the substitutent can be halogen, hydroxy, alkoxy, alkenyloxy, carboalkyl, carboalkoxy, aroylalkyl, cyano, nitro, alkylsulfonylalkyl, and the like. Exemplary of the epoxides which can be used are the vicinyl epoxides such as ethylene oxide, propylene oxide, cis-2-butene oxide, trans-2-butene oxide, 1-butene oxide, isobutylene oxide, cyclopentene oxide, cyclohexene oxide, butadiene monoxide, butadiene dioxide, methyl glycidate, epichlorohydrin, styrene oxide, α-methylstyrene oxide, epoxyallyl alcohol, vinylcyclohexane oxide, vinylcyclohexene monoxide, vinylcyclohexene dioxide, epoxyoleic acid, epoxycholesterol, etc. In addition to the vicinal epoxides, other epoxides such as trimethylene oxide and substituted trimethylene oxides wherein the substituent may be selected from saturated or ethylenically unsaturated aliphatic or cycloaliphatic radicals, or aromatic radicals can be used. Exemplary of these substituted trimethylene oxides are 1-methyltrimethylene oxide, 2-methyltrimethylene oxide, 1-chloromethyltrimethylene oxide, 2,2-bis(chloromethyl) trimethylene oxide, phenyltrimethylene oxide, dimethyltrimethylene oxide, etc.

Any acetylenic compound having the general formula $R_2—C \equiv C—R_3$ in which $R_2$ and $R_3$ which may be the same or different can be hydrogen, or any alkyl, alkenyl, cycloalkyl, cycloalkenyl, aryl, aralkyl, aralkenyl, alkaryl, or alkenylaryl hydrocarbon residue, as well as any substituted alkyl, alkenyl, cycloalkyl, cycloalkenyl, aryl, aralkyl, aralkenyl, alkaryl, or alkenylaryl hydrocarbon residue in which the substituent can be halogen, hydroxy, alkoxy, alkenyloxy, carboalkyl, carboalkoxy, aroylalkyl, cyano, nitro, alkylsulfonylalkyl, and the like, is suitable for the purposes of this invention.

In general, however, disubstituted acetylenic compounds in which both $R_2$ and $R_3$ is a hydrocarbon residue or a substituted hydrocarbon residue are more preferred than monosubstituted acetylenic compounds in which either $R_2$ or $R_3$ is hydrogen and the other of either $R_2$ or $R_3$ is a hydrocarbon residue or a substituted hydrocarbon residue, and these monosubstituted acetylenic compounds in turn are more preferred than acetylene itself where both $R_2$ and $R_3$ are hydrogen.

Some typical examples of suitable acetylenic compounds include 3-hexyne, 2-hexyne, 2-butyne, propyne, 4-octyne, dibenzylacetylene, dicyclopentylacetylene, 1-phenyl-2-propyne, bis(2-chloroethyl)-acetylene, 2,5-dimethyl-2,5-dihydroxy-3-hexyne, tertiarybutylacetylene, tertiaryamyl acetylene, α,α-dimethylbenzylacetylene, 1-hexyne, bis(trifluoromethyl)acetylene, acetylene, and the like.

The preparation of the π-(2,4)-(buteno-4-lactonyl) cobalt tricarbonyls, and 2,4-pentadieno-4-lactones therefrom, can be carried out in any inert, liquid diluent as, for example, ethers, ketones, esters, amides, sulfoxides, nitriles, hydrocarbons, etc. Exemplary of suitable diluents which can be used are dimethyl ether, diethyl ether, diisopropyl ether, dibutyl ether, anisole, dioxane, tetrahydrofuran, ethylene glycol dimethyl ether, diethyleneglycol dimethyl ether, acetone, methyl ethyl ketone, dimethylformamide, dimethylsulfoxide, acetonitrile, cyclohexanone, ethylacetate, benzene, toluene, hexane, n-heptane, pentane, etc. When salts of cobalt hydrotetracarbonyl are employed, the reaction will proceed only at an appreciable rate if the reaction is carried out in the more polar reaction diluents, in which the salts are at least slightly soluble. The ethers are the preferred inert reaction medium, particularly when the reaction is carried out catalytically.

The temperature of the reaction for the preparation of the π-(2,4)-(buteno-4-lactonyl) cobalt tricarbonyls, and 2,4-pentadieno-4-lactones therefrom, can be varied over a wide range, depending upon the other reaction conditions. However, since the cobalt complexes generally become less stable as the temperature is raised, lower temperatures are usually preferred. Generally, the reaction may be carried out at a temperature from about −10° C. to about 100° C., and preferably from about 0° C. to about 60° C. Any molar ratio of the organocobalt carbonyl and acetylenic compound may be used, but generally an excess over stoichiometric requirement of the acetylenic compound increases the rate of the reaction.

As pointed out hereinbefore, when acyl halides per se are employed as the starting material for the preparation of π-(2,4)-(buteno-4-lactonyl) cobalt tricarbonyls in accordance with this invention, carbon monoxide is not required for the reaction. However, when organic halides of the general formula R₄X, or ethylenically unsaturated compounds of the general formula RCH=CH₂, or epoxides of the general formula $$RCH\underset{O}{\overset{}{\diagdown\diagup}}CHR$$

or other epoxides such as trimethylene oxide, as described hereinbefore, are employed as the starting material for the synthesis of π-(2,4)-(buteno-4-lactonyl) cobalt tricarbonyls in accordance with this invention, then carbon monoxide is a necessary reactant, and must be used in an amount at least equivalent to 1 mole of carbon monoxide for each mole of organic halide, or olefinic compound, or epoxide. In the embodiments of this invention wherein carbon monoxide is a necessary reactant, it is convenient to carry out the reaction in an atmosphere of carbon monoxide wherein the pressure of carbon monoxide on the reaction mixture is preferably from about 0.1 atmosphere to about 3 atmospheres at temperature from about 0° C. to about 60° C. Carbon monoxide pressures appreciably above about 3 atmospheres have a tendency to decrease the rate of reaction; however, this effect can be at least partially overcome by employing a higher temperature of reaction. An advantage of carrying the reaction out in an atmosphere of carbon monoxide is that the course of the reaction can be followed by observing the amount of carbon monoxide absorbed. The amount of gas absorbed is usually a good indication of how much π-(2,4)-(buteno-4-lactonyl) cobalt tricarbonyl compound has been formed, since one mole of carbon monoxide should be absorbed for each mole of π-(2,4)-(buteno-4-lactonyl) cobalt tricarbonyl formed. Moreover, when carbon monoxide absorption stops, the reaction is complete.

The π-(2,4)-(buteno-4-lactonyl) cobalt tricarbonyl complexes can be isolated from the reaction mixture by any convenient means. Thus, they may be isolated by evaporation of the reaction diluent at low temperature, either at atmospheric pressure or reduced pressure. Most of these complexes are oxidized by air and, hence, should be protected by an inert atmosphere. A more convenient method of isolating these complexes is to form their monotriphenylphosphine derivatives, which are usually higher melting and more stable than the tricarbonyl complex per se. These derivatives are easily prepared by adding triphenylphosphine to a solution of the tricarbonyl complex at a temperature of from about 0° C. to about 50° C. The phosphine derivative is then readily isolated by distillation of the reaction diluent. However, since the π-(2,4)-(buteno-4-lactonyl) cobalt tricarbonyls are principally useful as chemical intermediates for the preparation of other useful compounds, such as the 2,4-pentadieno-4-lactones, isolation is not usually necessary, and the reaction solution in which they are prepared can usually be used directly for whatever purpose is desired.

π-(2,4)-(buteno-4-lactonyl) cobalt tricarbonyls which have at least one hydrogen atom on the No. 5-carbon atom are readily converted into 2,4-pentadieno-4-lactones, in accordance with this invention, by reacting them with a base.

Exemplary of the bases that may be used for this purpose are metal alcoholates and phenoxides, such as sodium methoxide, lithium ethoxide, sodium phenoxide, potassium ethoxide, aluminum isopropoxide, potassium tertiary-butoxide, and the like; alkali metal and alkaline earth metal oxides and hydroxides such as calcium oxide, sodium hydroxide, magnesium hydroxide, potassium oxide, lithium hydroxide, and the like; and amines such as triethylamine, tri-n-butylamine, N-ethylmorpholine, dicyclohexylamine, dicyclohexylethylamine, diethylaniline, N-ethylpiperidine, isopropyl di-n-butylamine, isopropyldiethylamine, and the like. The tertiary amines, such as dicyclohexylethylamine, tri - n - butylamine, isopropyldiethylamine, and the like, which are termed "hindered bases," and which are relatively mild bases, are preferred for the purposes of this invention because they do not promote side reactions, i.e., they do not react with the products and do not complex with cobalt. The stronger bases, such as the metal alcoholates, oxides and hydroxides of the alkali and alkaline earth metals, and the like, are stronger bases and are not hindered. Since such stronger bases tend to cause side reactions such as addition of the base to the double bonds, opening of the lactone ring by the base, or coordination of the base with the cobalt, they should be added in small amounts only as required to neutralize the cobalt hydrotetracarbonyl formed in order to keep the side reactions at a minimum. When hindered bases are employed, the base may all be added initially. In any case, at least one equivalent of the base, based on the organo cobalt tetracarbonyl employed, should be used. Better yields of product are generally obtained at temperatures below about 60° C., and in the case of the stronger unhindered bases reaction usually occurs best below room temperature.

When the reaction is carried out catalytically, carbon monoxide must be present in order to regenerate the catalyst, and should be used in an amount at least stoichiometrically equivalent to the catalyst employed in the reaction; otherwise it is not necessary. It is convenient to carry out the catalytic reaction in an atmosphere of carbon monoxide wherein the pressure of carbon monoxide on the reaction mixture is preferably from about 0.1 atmosphere to about 3 atmospheres, and it is useful to measure the amount of carbon monoxide absorbed during the reactions because this gives an indication of the amount of product being formed and of when the reaction is complete.

From the foregoing description it is apparent that this invention makes possible the preparation of a completely new group of useful chemical intermediates, namely, the π-(2,4)-(buteno-4-lactonyl) cobalt tricarbonyls, and also provides a much more general and convenient method for obtaining 2,4-pentadieno-4-lactones than has been available previously. As pointed out previously, the pentadieno-lactones generally are known to be useful biocidal agents. Due to their strong ultraviolet absorption, they are useful as ultraviolet screening agents to stabilize oils and polymers. The π-(2,4)-(buteno-4-lactonyl) cobalt tricarbonyls are also very soluble forms of cobalt, and hence are useful as catalysts for oxidation reactions, etc. The 2,4-pentadieno-4-lactones also represent a useful class of chemical intermediates, since they undergo reactions typical of compounds containing a conjugated double bond.

What I claim and desire to protect by Letters Patent is:

1. The process for preparing a π-(2,4)-(buteno-4-lactonyl) cobalt tricarbonyl which comprises reacting an acylcobalt tetracarbonyl of the general formula $$R_1-\overset{O}{\overset{\|}{C}}-Co(CO)_4$$

in which R₁ represents a radical of the group consisting of saturated and ethylenically unsaturated aliphatic and cycloaliphatic radicals, and aromatic radicals, with an acetylenic compound of the general formula $$R_2-C\equiv C-R_3$$

in which R₂ and R₃ each represents a radical of the group consisting of hydrogen, saturated and ethylenically unsaturated aliphatic and cycloaliphatic radicals, and aromatic radicals, the aromatic group of said aromatic radicals being a hydrocarbon aromatic group.

2. The process in accordance with claim 1 wherein the acylcobalt tetracarbonyl is formed in situ by reacting a salt of cobalt hydrotetracarbonyl with an acyl halide of the general formula

in which $R_1$ represents a radical of the group consisting of saturated and ethylenically unsaturated aliphatic and cycloaliphatic radicals, and aromatic radicals, and X represents halogen, the aromatic group of said aromatic radicals being a hydrocarbon aromatic group.

3. The process in accordance with claim 1 wherein the acylcobalt tetracarbonyl is formed in situ by reacting a salt of cobalt hydrotetracarbonyl and carbon monoxide with an organic halide of the general formula $R_4X$ in which $R_4$ represents a radical of the group consisting of saturated and ethylenically unsaturated aliphatic and cycloaliphatic radicals, and X represents halogen.

4. The process for preparing 2,3-diethyl-π-(2,4)-(penteno-4-lactonyl) cobalt tricarbonyl which comprises reacting acetyl chloride, sodium cobalt tetracarbonyl, and 3-hexyne.

5. The process for preparing 2,3-diethyl-7-hydroxy-π-(2,4)-(hepteno-4-lactonyl) cobalt tricarbonyl which comprises reacting trimethylene oxide, cobalt hydrotetracarbonyl, carbon monoxide, and 3-hexyne.

6. The process for preparing 2,3-bis(1-methyl-1-hydroxy-ethyl) - 5 - carboethoxy - π - (2,4) - (penteno - 4-lactonyl) cobalt tricarbonyl which comprises reacting ethyl bromoacetate, sodium cobalt tetracarbonyl, and 2,5-dimethyl-2,5-dihydroxy-3-hexyne.

7. The process for preparing 2,3-diethyl-4-phenyl-π-(2,4)-(buteno-4-lactonyl) cobalt tricarbonyl which comprises reacting benzoyl bromide, sodium cobalt tetracarbonyl, and 3-hexyne.

8. As a new composition of matter, π-(2,4)-(buteno-4-lactonyl) cobalt tricarbonyl.

9. 2,3 - diethyl - π - (2,4) - (penteno - 4 - lactonyl) cobalt tricarbonyl.

10. 2,3 - diethyl - 7 - hydroxy - π - (2,4) - (hepteno-4-lactonyl) cobalt tricarbonyl.

11. 2,3 - bis(1 - methyl - 1 - hydroxy - ethyl) - 5 - carboethoxy-π-(2,4)-(penteno-4-lactonyl) cobalt tricarbonyl.

12. 2,3 - diethyl - 4 - phenyl - π - (2,4) - (buteno - 4-lactonyl) cobalt tricarbonyl.

No references cited.

ALEX MAZEL, *Primary Examiner.*

J. A. NARCAVAGE, *Assistant Examiner.*